United States Patent
Jia et al.

(10) Patent No.: US 12,008,176 B2
(45) Date of Patent: Jun. 11, 2024

(54) ACTIVE STYLUS WITH WIRELESS CHARGING

(71) Applicant: Google LLC, Mountain View, CA (US)

(72) Inventors: Liang Jia, Mountain View, CA (US); Srikanth Lakshmikanthan, Milpitas, CA (US); Liyu Yang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/002,192

(22) PCT Filed: Aug. 31, 2020

(86) PCT No.: PCT/US2020/048804
§ 371 (c)(1),
(2) Date: Dec. 16, 2022

(87) PCT Pub. No.: WO2022/046118
PCT Pub. Date: Mar. 3, 2022

(65) Prior Publication Data
US 2023/0221813 A1 Jul. 13, 2023

(51) Int. Cl.
*G06F 3/0354* (2013.01)
*H02J 7/00* (2006.01)
(Continued)

(52) U.S. Cl.
CPC ........ *G06F 3/03545* (2013.01); *H02J 7/0044* (2013.01); *H02J 50/005* (2020.01); *H02J 50/90* (2016.02)

(58) Field of Classification Search
None
See application file for complete search history.

(56) References Cited

U.S. PATENT DOCUMENTS

| 2013/0119929 A1 | 5/2013 | Partovi |
| 2016/0006288 A1 | 1/2016 | Wagman et al. |

(Continued)

FOREIGN PATENT DOCUMENTS

| CN | 111180173 A | 5/2020 |
| CN | 210724238 U | 6/2020 |

OTHER PUBLICATIONS

International Preliminary Report on Patentability from International Application No. PCT/US2020/048804 dated Feb. 28, 2023, 8 pp.

(Continued)

*Primary Examiner* — Duane N Taylor, Jr.
(74) *Attorney, Agent, or Firm* — Shumaker & Sieffert, P.A.

(57) ABSTRACT

An example active stylus includes a core comprising: a main cylinder having a first end, a second end; a first supplemental cylinder disposed at the first end of the main cylinder and having a diameter that is larger than a diameter of the main cylinder; a second supplemental cylinder disposed between the first supplemental cylinder and the second end of the main cylinder and having a diameter that is larger than the diameter of the main cylinder; and a wireless charging receive coil configured to transduce flux of a magnetic field generated by a wireless charging transmit coil into electrical current, wherein the wireless charging receive coil is positioned around a longitudinal axis of the main cylinder of the core and between the first supplemental cylinder and the second supplemental cylinder.

14 Claims, 16 Drawing Sheets

(51) Int. Cl.
  *H02J 50/00* (2016.01)
  *H02J 50/90* (2016.01)

(56) References Cited

U.S. PATENT DOCUMENTS

2021/0384754 A1* 12/2021 Xu ........................ H01F 7/0247
2023/0067179 A1* 3/2023 Kim ........................ H02J 50/12

OTHER PUBLICATIONS

International Search Report and Written Opinion of International Application No. PCT/US2020/048804 dated May 21, 2021, 13 pp.
Jia et al., "Efficient wireless charging of peripheral devices", Technical Disclosure Commons, Retrieved from: https://www.tdcommons.org/cgi/viewcontent.cgi?article=3942&context=dpubs_series, Jan. 16, 2020, 7 pp.

* cited by examiner

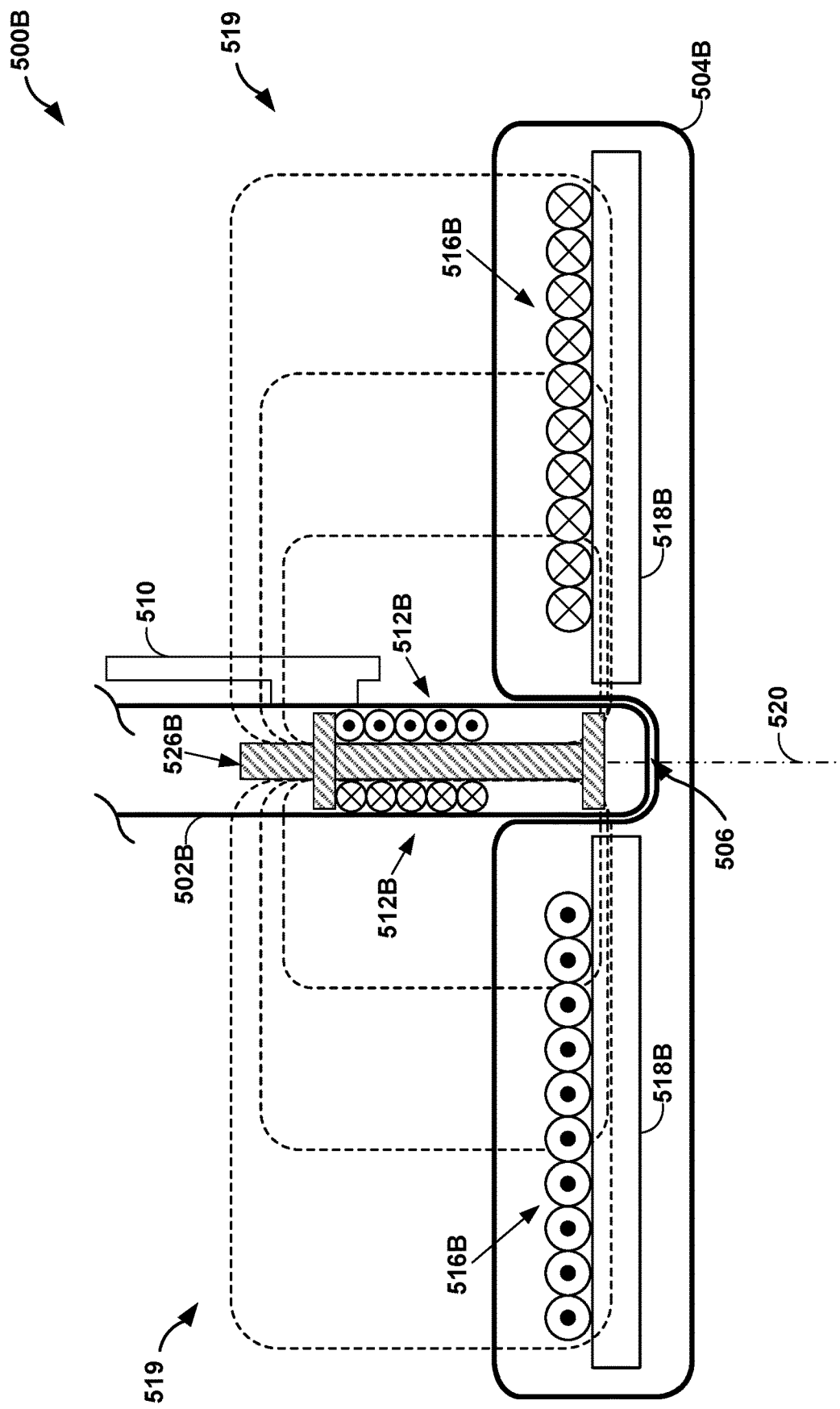

ACTIVE STYLUS WITH WIRELESS CHARGING

BACKGROUND

Computing devices, such as smartphones, laptops, and tablets, may include presence sensitive displays capable of detecting user input as touch gestures performed with a user's fingers. However, in some examples, performing gestures with fingers may be undesirable. As such, a stylus may be used to provide user input, which may be detected by a computing device. When a stylus has been used as an input device, the stylus has traditionally been finger-like in nature. A conventional stylus is often simply a conductive rod with a finger-sized rounded tip large enough to disrupt the electric field lines between the drive and sense electrodes of a capacitive touch sensor panel. As such, conventional styluses are often passive input devices in that they are incapable of actively transmitting stimulus signals or sensing a touch-induced capacitance change in a capacitive touch sensor panel. Recently, also active styli have emerged that are capable of actively transmitting signals to a capacitive touch sensor panel and/or receiving signals from said panel.

SUMMARY

In general, this disclosure describes an active stylus with wireless charging functionality. An active stylus may include a power storage device and one or more components that operate using electrical energy provided by the power storage device. It may be desirable for the power storage device to be rechargeable, however it may not be desirable to include a wired connection in the stylus via-which the power storage device may be recharged. As such, it may be desirable for a power storage device of an active stylus to be wirelessly charged. An active stylus with wireless charging may include a receive coil (e.g., a receiver coil) in which a current may be induced as a result of a magnetic field generated by a transmit coil (e.g., a transmitter coil). The efficiency of wireless charging may be dependent on a coupling factor, which is representative of how much flux of the generated magnetic field penetrates the receive coil. In accordance with one or more techniques of this disclosure, an active stylus may include a core configured to increase an amount of flux that penetrates the receive coil. The core may be shaped in a variety of ways, each with advantages and disadvantages. Core shapes may be referred to by letters that they resemble. As one specific example, an active stylus may include a Tu (Chinese character 圡) shaped core. By including a core in an active stylus, the coupling factor may be increased, thus improving charging efficiency.

In one example, an active stylus includes a power storage device; one or more components configured to operate using electrical energy provided by the power storage device; a core comprising: a main cylinder having a first end, a second end; a first supplemental cylinder disposed at the first end of the main cylinder and having a diameter that is larger than a diameter of the main cylinder; a second supplemental cylinder disposed between the first supplemental cylinder and the second end of the main cylinder and having a diameter that is larger than the diameter of the main cylinder; and a wireless charging receive coil configured to provide received power to the power storage device, wherein the wireless charging receive coil is positioned around a longitudinal axis of the main cylinder of the core and between the first supplemental cylinder and the second supplemental cylinder.

In another example, a system includes system comprising: a charger comprising a wireless charging transmit coil; and an active stylus comprising: a core comprising: a main cylinder having a first end, a second end; a first supplemental cylinder disposed at the first end of the main cylinder and having a diameter that is larger than a diameter of the main cylinder; a second supplemental cylinder disposed between the first supplemental cylinder and the second end of the main cylinder and having a diameter that is larger than the diameter of the main cylinder; and a wireless charging receive coil configured to transduce flux of a magnetic field generated by the wireless charging transmit coil into electrical current, wherein the wireless charging receive coil is positioned around a longitudinal axis of the main cylinder of the core and between the first supplemental cylinder and the second supplemental cylinder.

The details of one or more aspects of this disclosure are set forth in the accompanying drawings and the description below. Other features, objects, and advantages of the disclosure will be apparent from the description and drawings, and from the claims.

BRIEF DESCRIPTION OF DRAWINGS

FIGS. 5A-5C are conceptual diagrams illustrating cross sections of example systems that include a charger and an active stylus configured to wirelessly receive electrical energy from the charger, in accordance with one or more aspects of this disclosure.

DETAILED DESCRIPTION

Figure 1A:
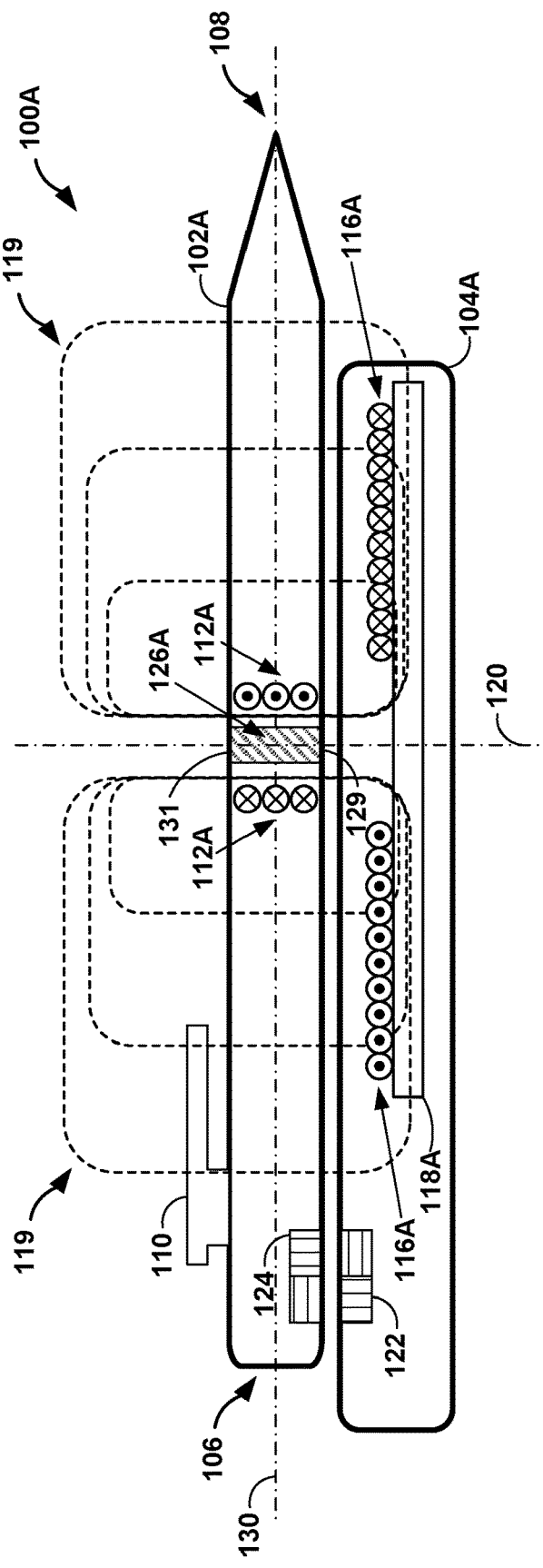
FIGS. 1A-1C are conceptual diagrams illustrating cross sections of example systems that include a charger and an active stylus configured to wirelessly receive electrical energy from the charger, in accordance with one or more aspects of this disclosure.
Figure 1B:
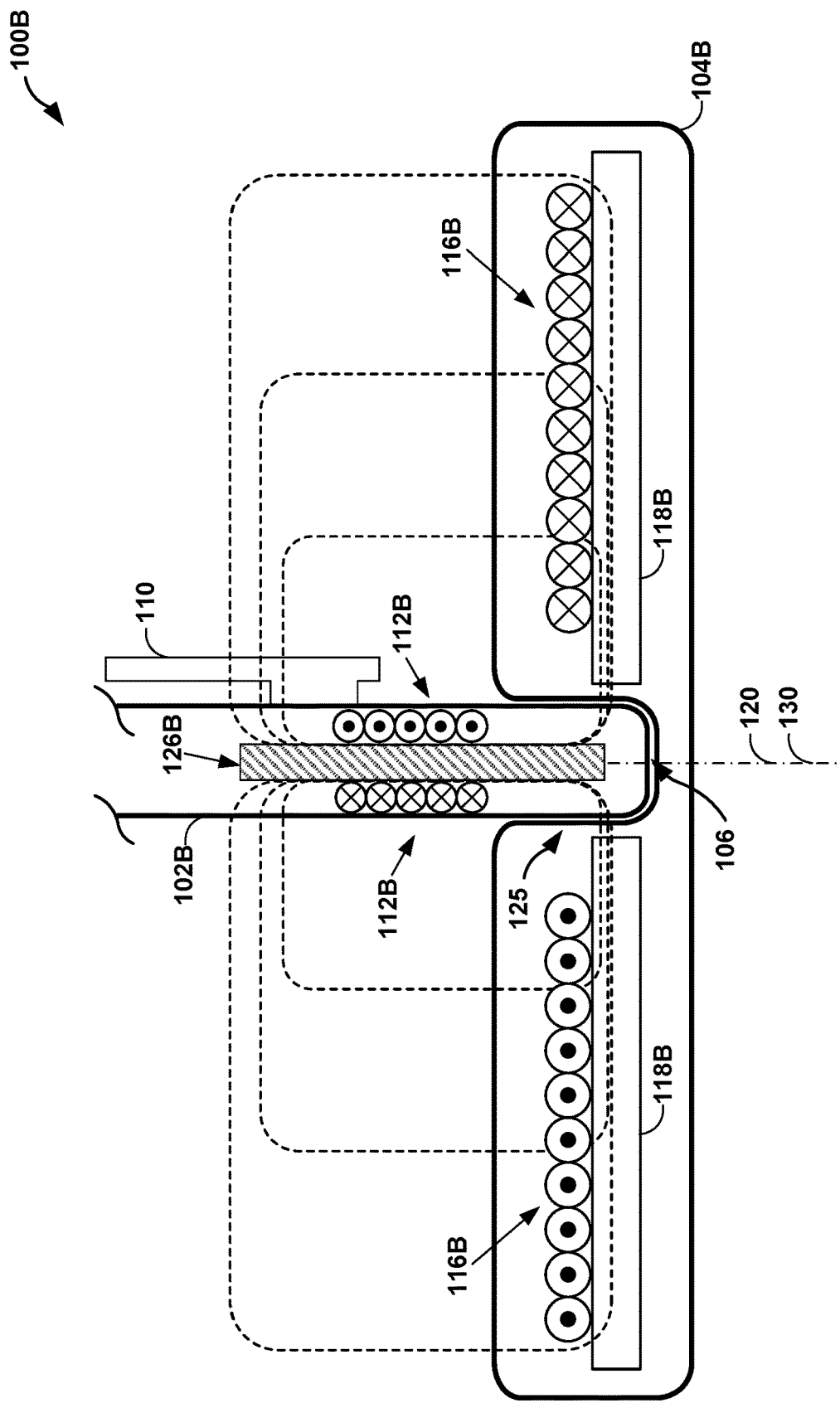
Figure 1C:
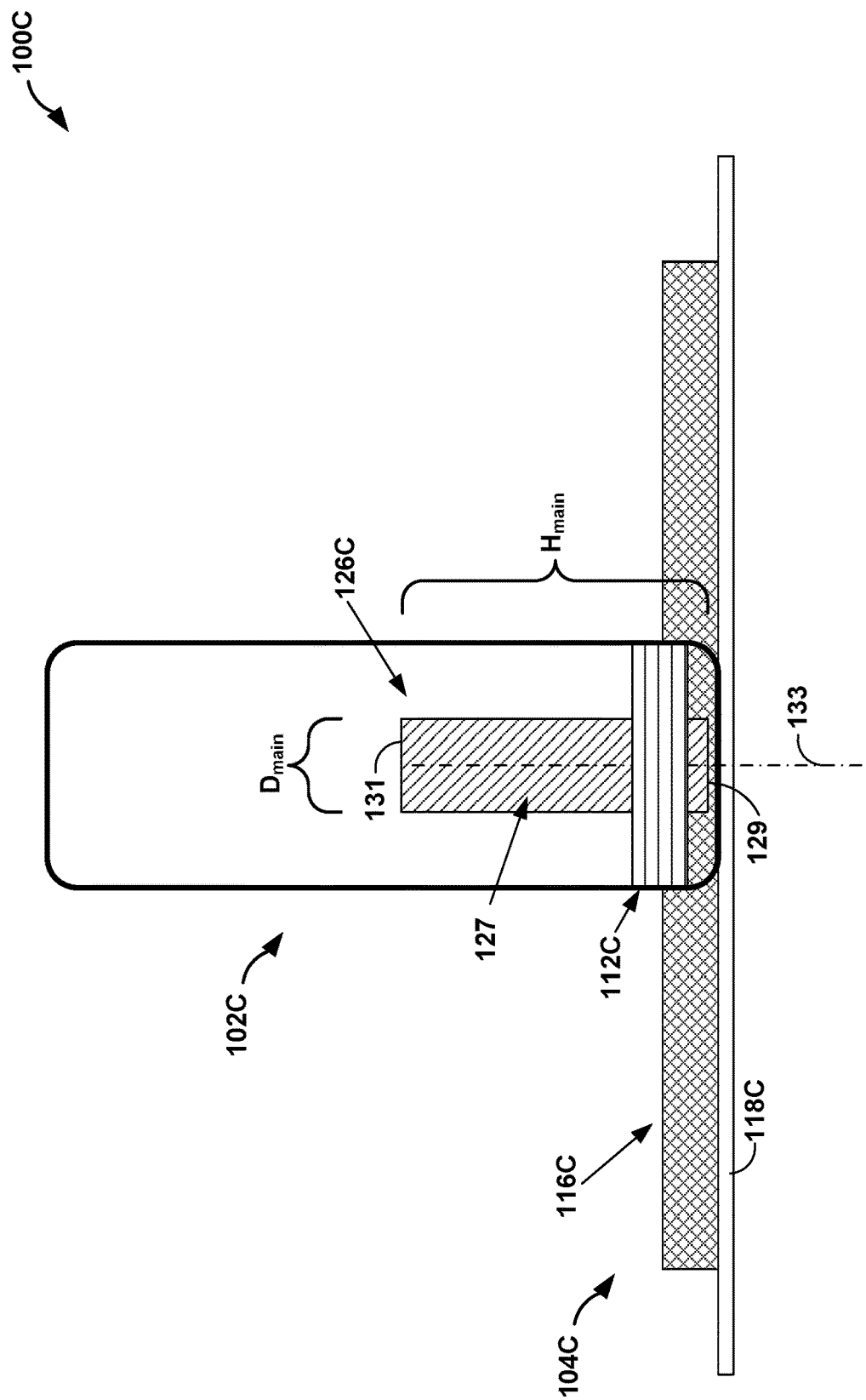

FIGS. 1A-1C are conceptual diagrams illustrating example systems that include a charger and an active stylus configured to wirelessly receive electrical energy from the charger, in accordance with one or more aspects of this disclosure. As shown in FIGS. 1A-IC, each of systems 100A-100C includes a respective active stylus of active styli 102A-102C (collectively, "active styli 102") and a respective charger of chargers 104A-104C (collectively, "chargers 104").

Active styli 102 may be used to interact with other devices. For instance, a user may maneuver active stylus 102A near a display device (e.g., of a computing device such as a tablet, smartphone, smartwatch, kiosk, monitor, and the like) to provide user input to the display device. As shown in FIGS. 1A-1C, each of active styli 102 may have a longitudinal axis 130, a first end 106, and a second end 108. Additionally, in some examples, each of active styli 102 may a clip 110 to facilitate attachment to the display device or any other object.

Each of active styli 102 may include a power storage device and one or more components (not shown) configured to operate using electrical energy provided by the power storage device. Examples of power storage devices include batteries, such as rechargeable batteries (i.e., secondary cells), or any other type of rechargeable electrical storage component. The components configured to operate using electrical energy provided by the power storage device may render active stylus 102A "active" in that they may be configured to actively transmit signals to, or receive signals from, another device (e.g., a display panel). Examples of such components include, but are not necessarily limited to, transmitters, receivers, processors, lights, electromagnets, buttons, etc.

As shown in FIGS. 1A-1C, active styli of active styli 102 may each include a wireless charging receive coil configured to provide received power to the power storage device. For instance, each of active styli 102 may include a respective wireless charging receive coil of wireless charging receive coils 112A-112C (collectively, "wireless charging receive coils 112"). A wireless charging receive coil of wireless charging receive coils 112 may be formed of a winding on conductive material (e.g., copper wire). In some examples, wireless charging receive coils 112 may be compliant with (e.g., have dimensions and/or properties) a wireless charging standard such as the Qi specification published by the Wireless Power Consortium (e.g., available at wirelesspowerconsortium.com/knowledge-base/specifications/download-the-qi-specifications.html).

Wireless charging receive coils can be placed in a variety of orientations. As one example, as shown in FIG. 1A, wireless charging receive coil 112A may be positioned in an orientation such that active stylus 102A is charged when placed horizontally on charger 104A (e.g., where longitudinal axis 130 is parallel to a coil of charger 104A, such as wireless charging transmit coil 116A). This may be referred to as horizontal charging. As another example, as shown in FIG. 1B, wireless charging receive coil 112B may be positioned in an orientation such that active stylus 102B is charged when placed vertically on charger 104B (e.g., where longitudinal axis 130 is parallel to a coil of charger 104B, such as wireless charging transmit coil 116B). This may be referred to as vertical charging.

Each of chargers 104 may include a wireless charging transmit coil of wireless charging transmit coils 116A-116C (collectively, "wireless charging transmit coils 116"). A wireless charging transmit coil of wireless charging transmit coils 116 may be formed of a winding on conductive material (e.g., copper wire). In some examples, wireless charging transmit coils 116 may be compliant with (e.g., have dimensions and/or properties) a wireless charging standard such as the Qi specification published by the Wireless Power Consortium (e.g., available at wirelesspowerconsortium.com/knowledge-base/specifications/download-the-qi-specifications.html). In some examples, a charger of chargers 104 may include shielding. For instance, charger 104A may include shielding 118A and/or charger 104B may include shielding 118B.

For purposes of explanation, the following operational notes refer to active stylus 102A and charger 104A, however other active styli and chargers may operate under similar principles. In operation, charger 104A may wirelessly transfer electrical energy to active stylus 102A. For instance, charger 104A may be brought into proximity with active stylus 102A and one or both of charger 104A and active stylus 102A may detect the presence of the other. Following detection, charger 104A may energize wireless charging transmit coil 116A. For instance, charger 104A may use electrical energy (e.g., sourced from a battery of charger 104A or an external power source) to cause an electrical current to flow through wireless charging transmit coil 116A. The flowing of current through wireless charging transmit coil 116A may create an electromagnetic field with flux 119.

At least a portion of flux 119 may pass through wireless charging receive coil 112A. The portion of flux 119 that passes through wireless charging receive coil 112A may induce a current in wireless charging receive coil 112A. Active stylus 102A may route the current induced in wireless charging receive coil 112A to charge a power storage device of active stylus 102A.

As discussed above, the efficiency of wireless charging may be dependent on a coupling factor, which is representative of how much flux of the generated magnetic field penetrates the receive coil. The coupling factor may be represented as a value between 0 and 1 where 1 expresses perfect coupling (i.e., all flux generated penetrates the receiver coil) and 0 expresses a system, where transmitter and receiver coils are independent of each other. In some scenarios, even when greater than 0, a minimum coupling factor may be needed in order for wireless charging to occur. As one specific example, a minimum coupling factor of 0.6 may be needed for charger 104A to wirelessly charge active stylus 102A. The coupling factor may be influenced by a wide variety of parameters. Some example parameters include, but are not limited to, alignment of the coils, a distance between the coils, a relative size of the coils, shapes of the coils, and an angle between the coils.

Charging coils may be considered to be aligned where their primary axes (i.e., an axis perpendicular to a centroid of the coil) are aligned. For instance, as shown in FIG. 1A, wireless charging transmit coil 116A and wireless charging receive coil 112A are considered to be aligned as the primary axes of both coils are identical as axis 120. In some examples, an active stylus or a charger may include one or more features configured to assist in aligning the primary axes of the charging coils.

As one example, in systems where the wireless receive coil is configured for horizontal charging (e.g., system 100A of FIG. 1A), the stylus and charger may both include alignment aids. For instance, as shown in FIG. 1A, active stylus 102A may include alignment aid 124 and charger 104A may include alignment aid 122. Alignment aids 122 and 124 may be magnets configured to guide positioning of active stylus 102A relative to charger 104A such that a primary axis of wireless charging receive coil 112A is aligned with a primary axis of wireless charging transmit coil 116A.

As another example, in systems where the wireless receive coil is configured for vertical charging (e.g., system 100B of FIG. 1B), the charger may include an alignment aid. For instance, as shown in FIG. 1B, charger 104B may include alignment aid 125. Alignment aid 125 may be a hole or other physical feature into which an end of active stylus 102B may be inserted (e.g., first end 106) such that a primary axis of wireless charging receive coil 112B is aligned with a primary axis of wireless charging transmit coil 116B. As shown in FIG. 1B, active stylus 102B may include core 126B.

Due to various considerations of stylus design, it may not be possible to utilize a design for wireless charging receive coil that results in a favorable coupling factor. For instance, due to size limitations, it may not be possible to use a relatively similarly sized coil as used in a wireless charger. As discussed above, the relative size of the coils is a parameter that influences the coupling factor.

In accordance with one or more aspects of this disclosure, an active stylus may include a core configured to increase an amount of flux that penetrates the receive coil. For instance, active stylus 102A may include core 126A configured to increase an amount of flux 119 that penetrates wireless charging receive coil 112A. By increasing the amount of flux 119 that penetrates wireless charging receive coil 112A, core 126A may improve the coupling factor between wireless charging receive coil 112A and wireless charging transmit coil 116A.

Figure 3A:
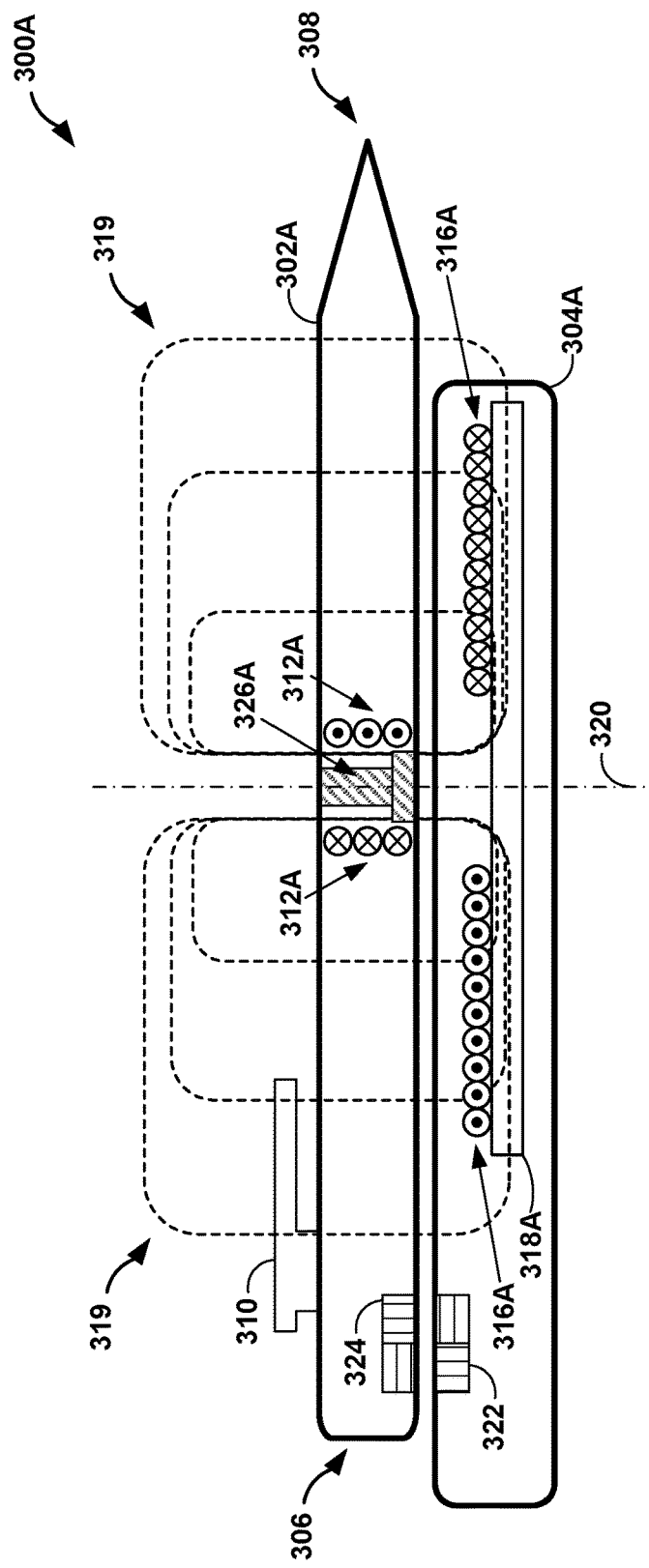
FIGS. 3A-3C are conceptual diagrams illustrating cross sections of example systems that include a charger and an active stylus configured to wirelessly receive electrical energy from the charger, in accordance with one or more aspects of this disclosure.
Figure 3B:
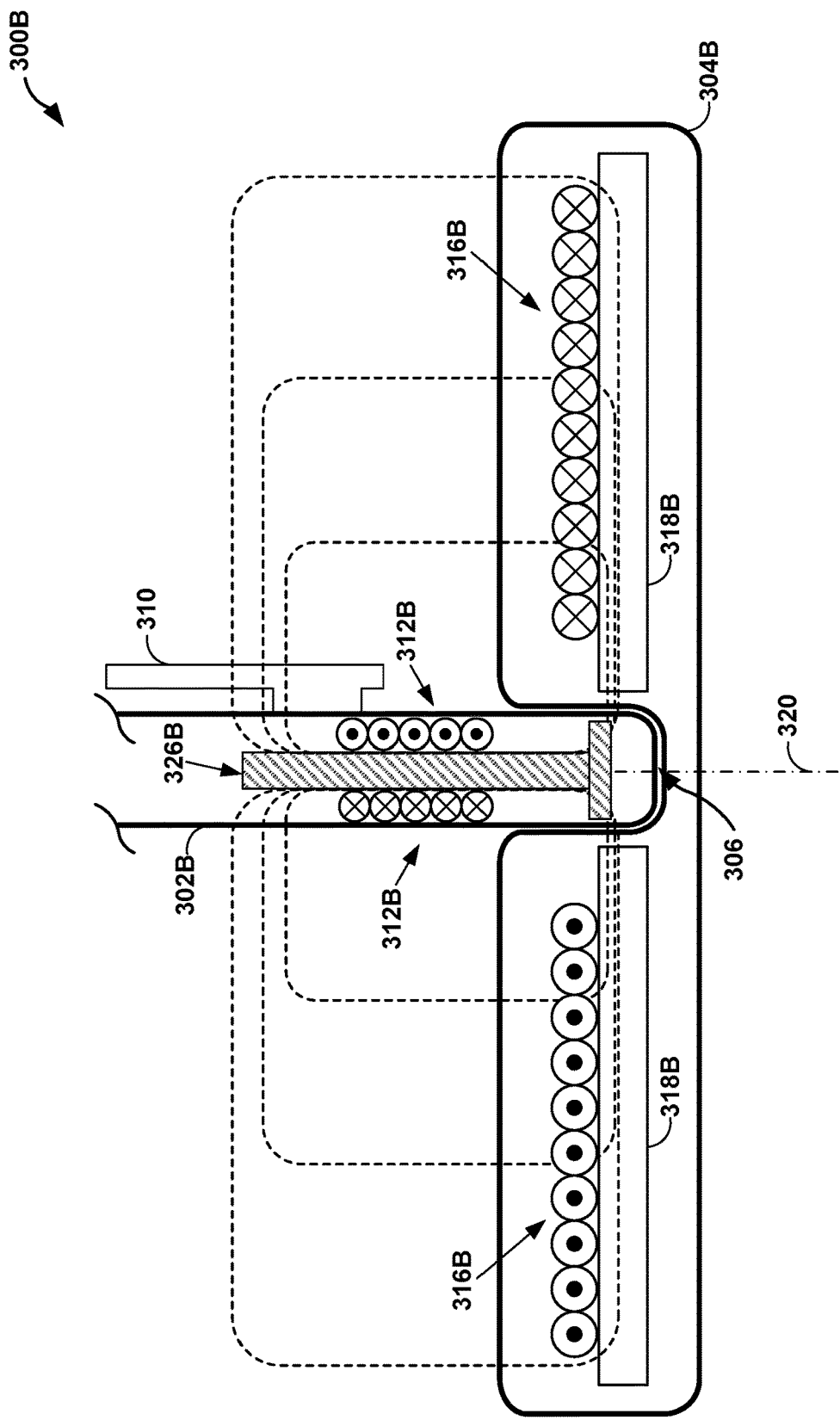
Figure 3C:
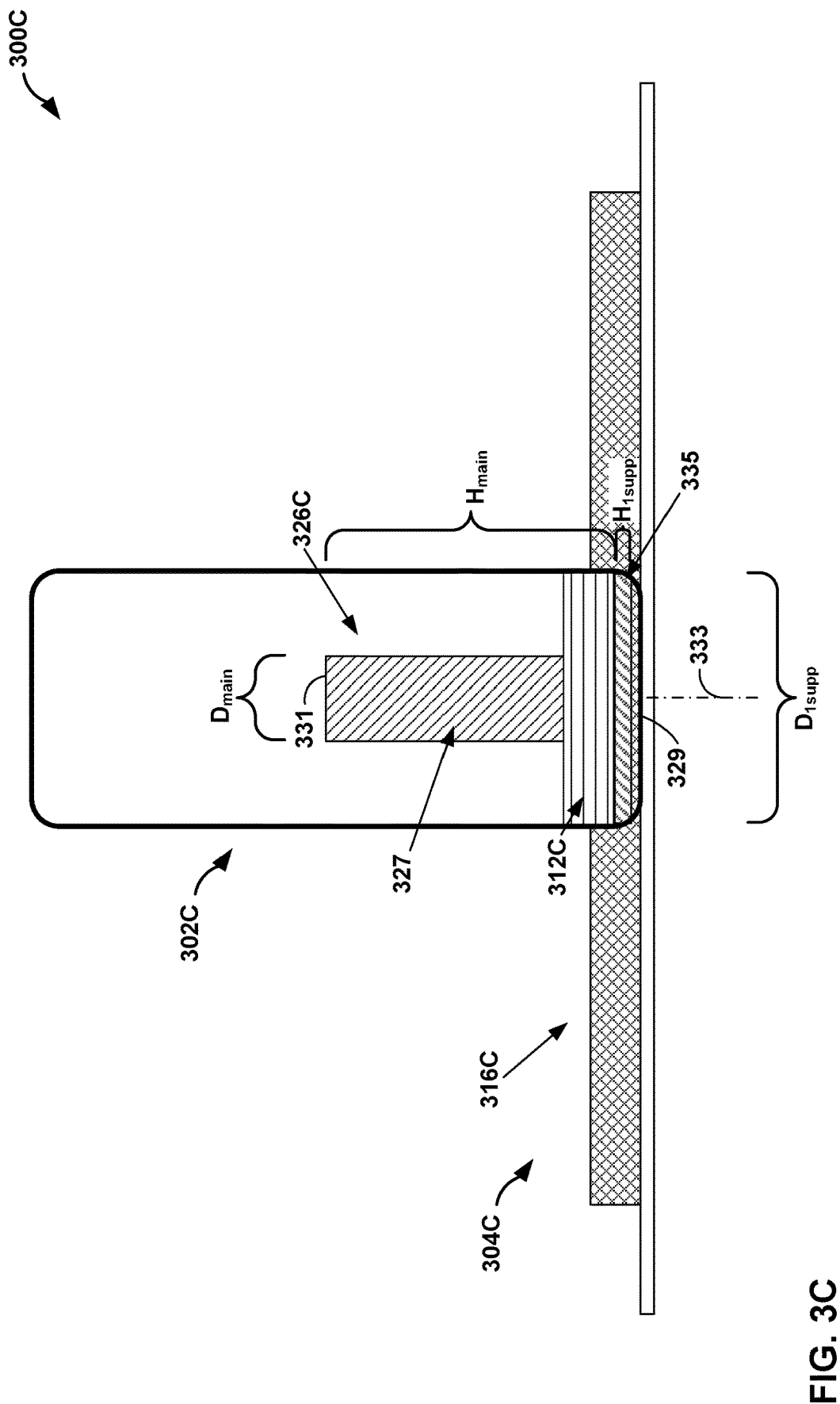
Figure 5A:
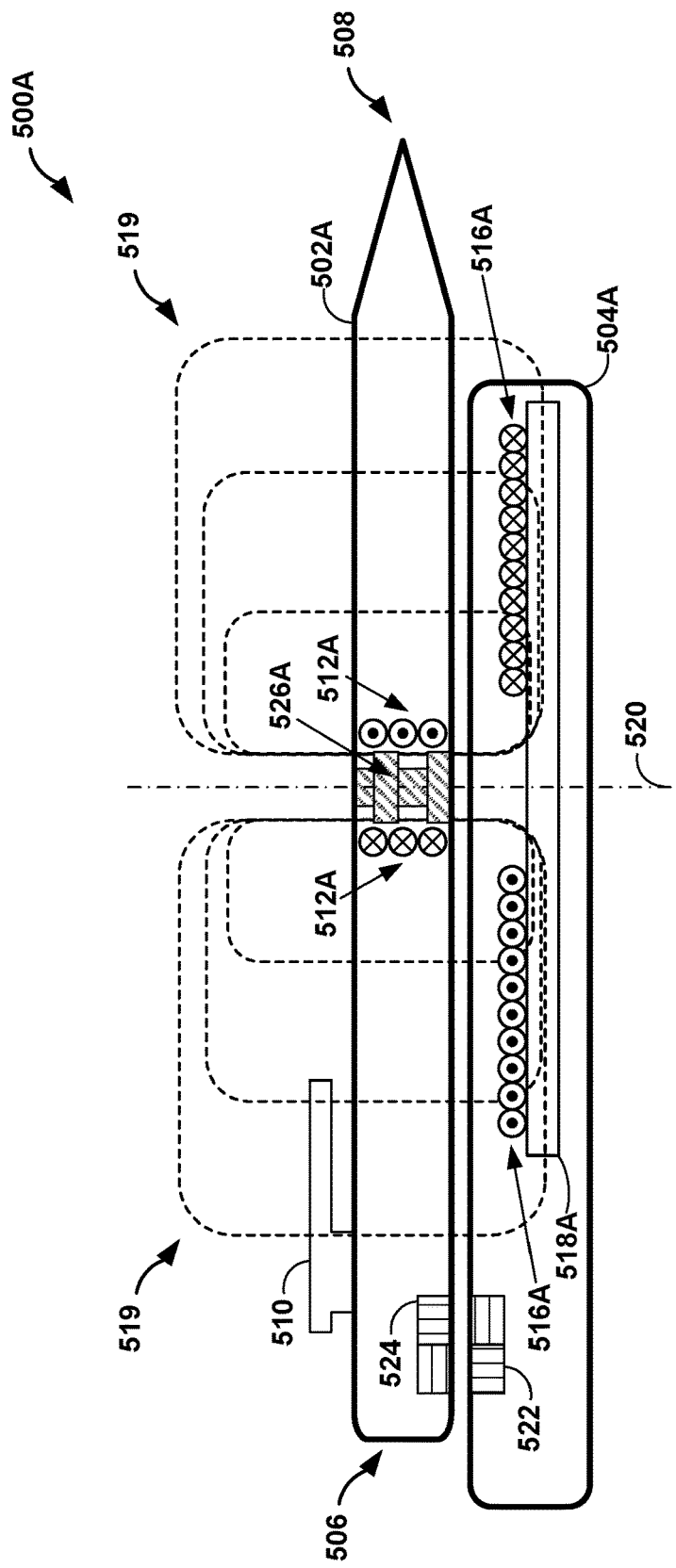
Figure 5C:
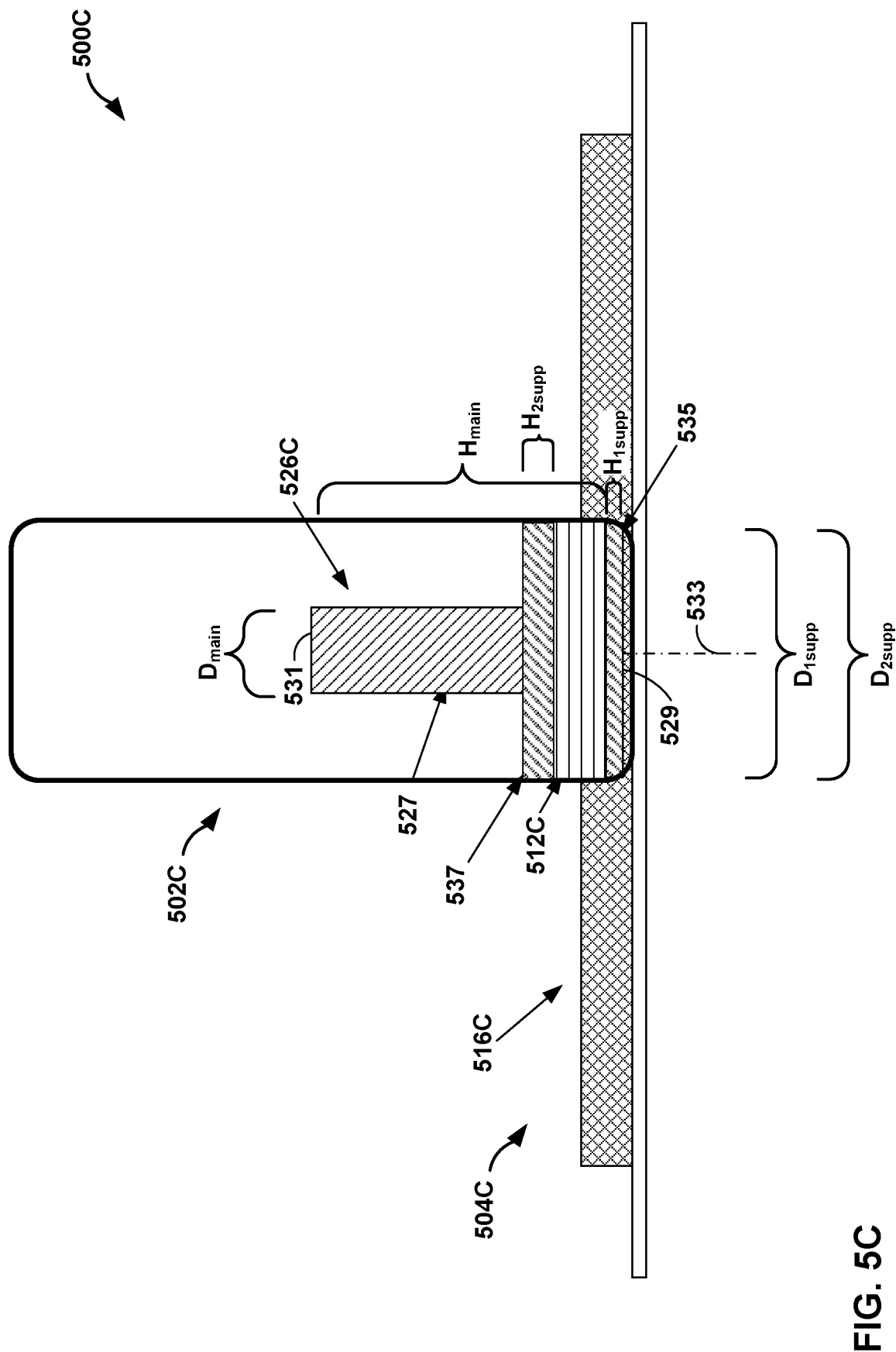
Figure 7A:
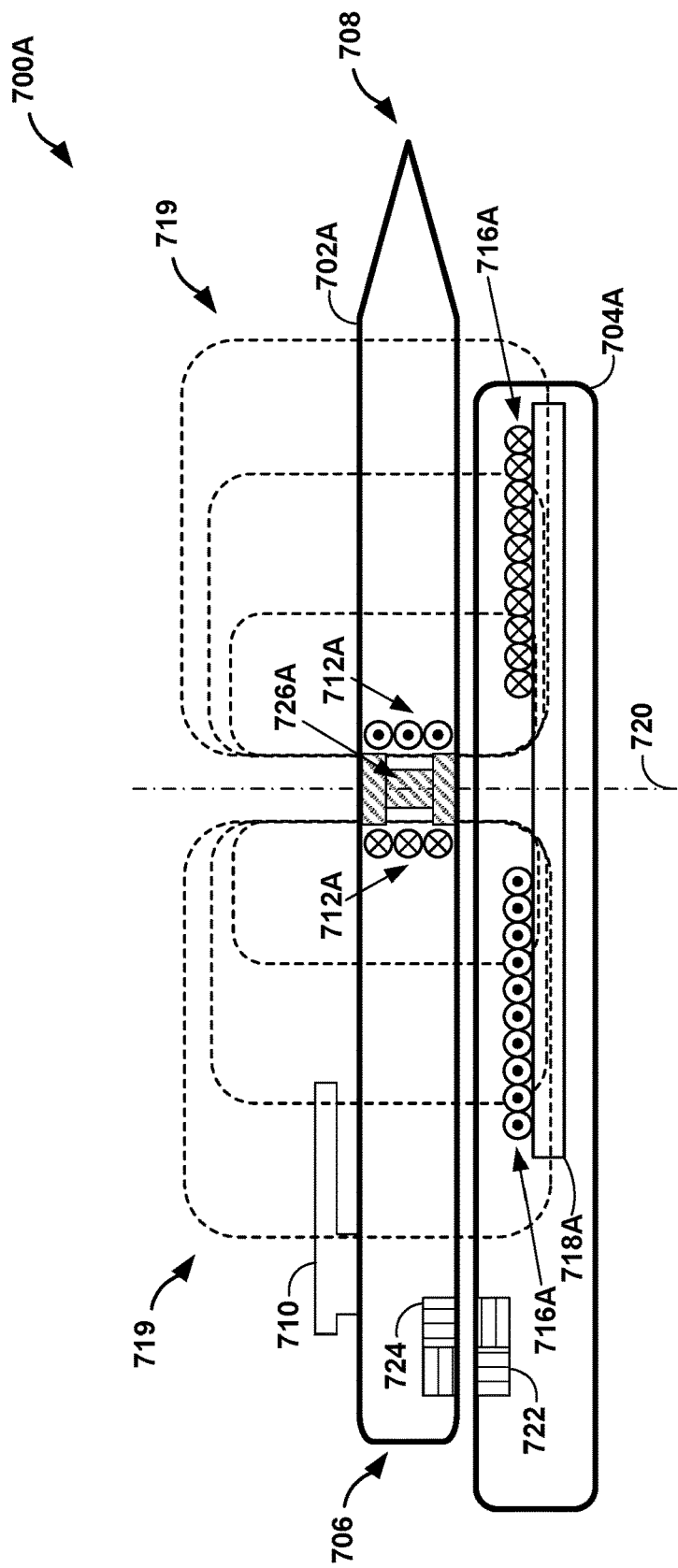
FIGS. 7A-7C are conceptual diagrams illustrating cross sections of example systems that include a charger and an active stylus configured to wirelessly receive electrical energy from the charger, in accordance with one or more aspects of this disclosure.
Figure 7B:
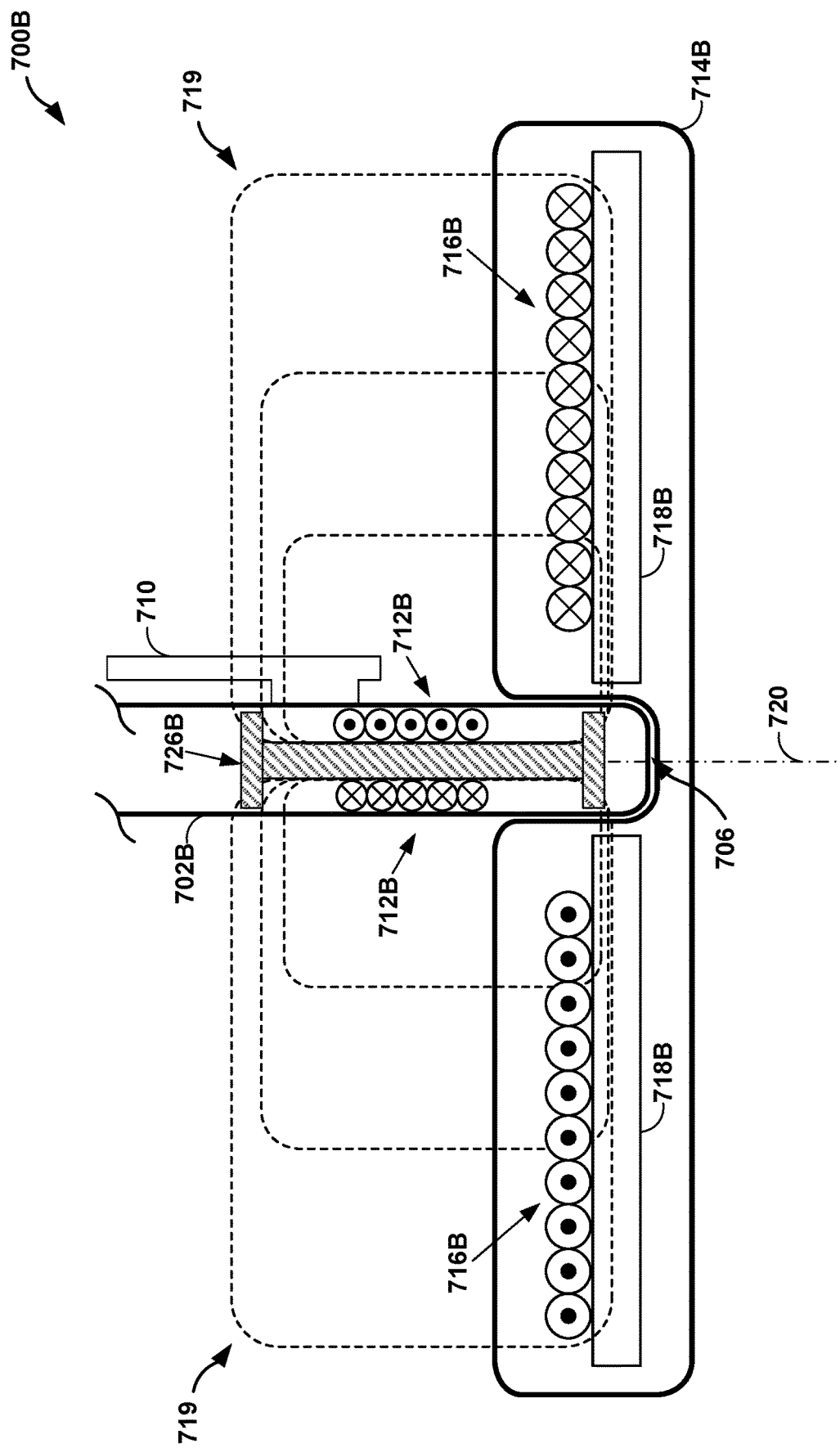
Figure 7C:
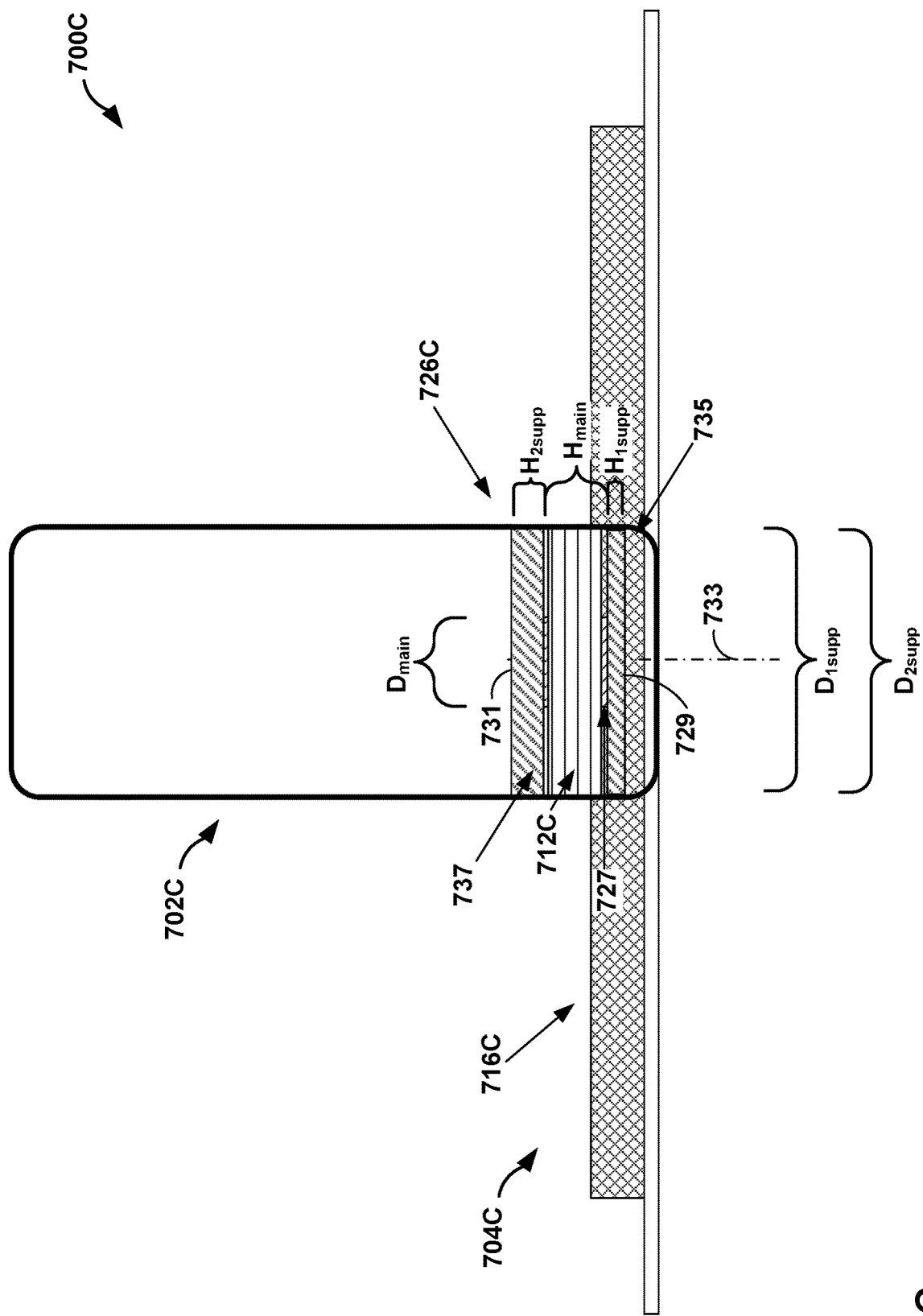

The core may be shaped in a variety of ways, each with advantages and disadvantages. This disclosure describes four different core shapes. Core shapes may be referred to by letters that they resemble. FIGS. 1A-1C describe a first core shape, which may be referred to as an I-core. FIGS. 3A-3C describe a second core shape, which may be referred to as a T-core. FIGS. 5A-5C describe a third core shape, which may be referred to as a I-core (e.g., Chinese character Tu core). FIGS. 7A-7C describe a fourth core shape, which may be referred to as a IL-core (e.g., Chinese character Gong core). Like reference numbers (i.e., same two-digit suffix) in FIGS. 3A-3C, 5A-5C, and 7A-7C refer to components similar to those in FIGS. 1A-1C. As one example, wireless charging receive coils 312A, 512A, and 712A perform operations similar to wireless charging receive coil 112A of FIG. 1A. As another example, chargers 304, 504, and 704 may perform operations similar to chargers 104 of FIGS. 1A-1C.

The core may be made from any suitable material that deflects or otherwise modifies the flow of flux, such as flux 119. For instance, core 126A may be made of a ferrite material.

As shown in FIGS. 1A-1C, an I-core, such as core 126C, may include a main cylinder 127 having a first end 129 and a second end 131. Main cylinder 127 may have diameter $D_{main}$, height $H_{main}$, and may define a longitudinal axis 120. The wireless charging receive coil may be positioned around a longitudinal axis of the core. For instance, as shown in FIG. 1C, wireless receive coil 112C may be positioned around longitudinal axis 133. In some examples, this may result in a primary axis of wireless receive coil being co-axial with the longitudinal axis of the core.

When configured for horizontal charging, the longitudinal axis of the main cylinder of the core may be perpendicular to a longitudinal axis of the active stylus. For instance, as shown in FIG. 1A, longitudinal axis 120 may be perpendicular to longitudinal axis 130. When configured for vertical charging, the longitudinal axis of the main cylinder of the core may be parallel to a longitudinal axis of the active stylus. For instance, as shown in FIG. 1B, longitudinal axis 120 may be perpendicular to longitudinal axis 130.

When included, alignment aids may configure the active stylus such that the core is in a desired orientation during charging. For instance, as shown in FIG. 1A, alignment aids 122 and 124 may be configured to align the active stylus such that, during charging, first end 129 of cylinder 127 is closer to a wireless charging transmit coil than second end 131 of cylinder 127.

Figure 2A:
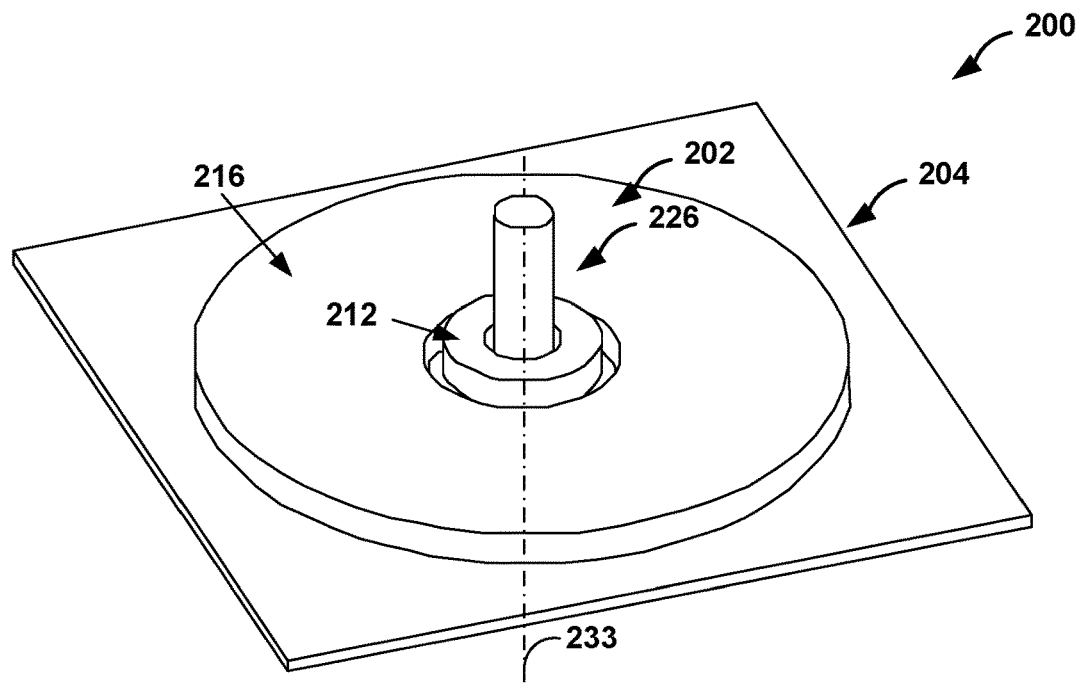
FIGS. 2A and 2B are conceptual diagrams illustrating an example system that includes a charger and an active stylus configured to wirelessly receive electrical energy from the charger, in accordance with one or more aspects of this disclosure.
Figure 2B:
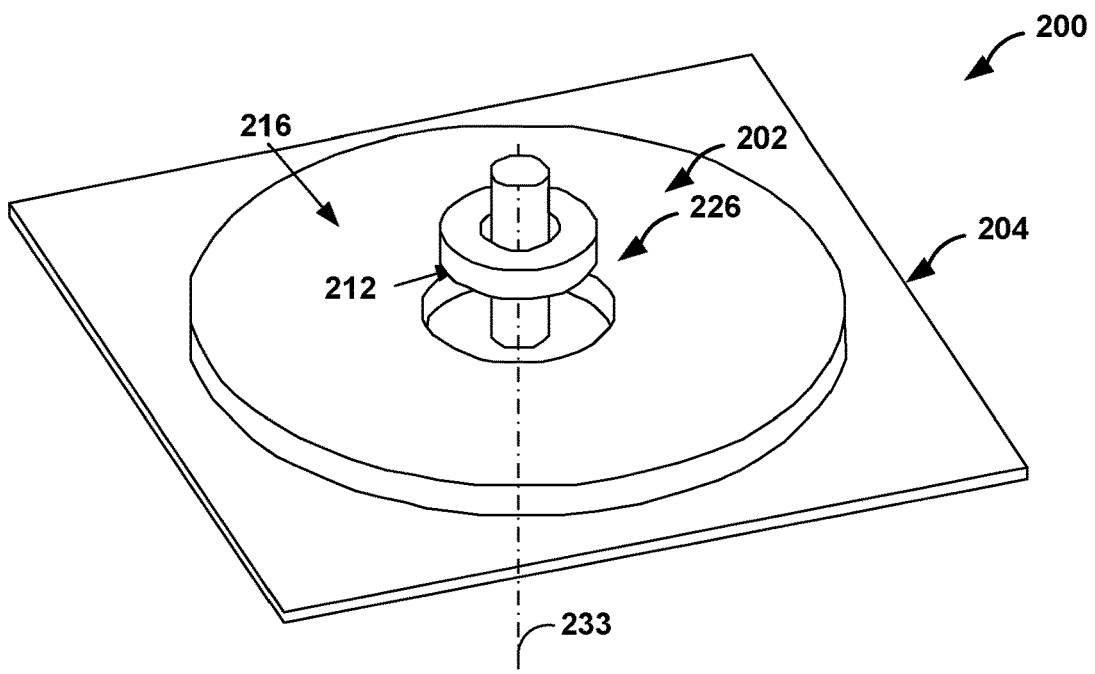

FIGS. 2A and 2B are conceptual diagrams illustrating an example system that includes a charger and an active stylus configured to wirelessly receive electrical energy from the charger, in accordance with one or more aspects of this disclosure. For purposes of illustration, housings and other components of the active stylus and charger are not shown in FIGS. 2A and 2B. Stylus 202 and charger 204 of FIGS. 2A and 2B may be considered an example of a stylus of styli 102 and a charger of chargers 104 of FIGS. 1A-1C. As shown in FIGS. 2A and 2B, stylus 202, and thus wireless charging receive coil 212 and core 226, may be positioned at various displacements along axis 233 with respect to charger 204, and thus wireless charging transmit coil 216. As discussed above, displacement between coils may influence a coupling factor between the coils. For instance, as the displacement in the example of FIG. 2A is less than the displacement in the example of FIG. 2B, the coupling factor may be greater in the example of FIG. 2A than in the example of FIG. 2B. With the use of an I-core, the coupling factor may be 0.73 in the example of FIG. 2A and 0.32 in the example of FIG. 2B.

FIGS. 3A-3C are conceptual diagrams illustrating example systems that include a charger and an active stylus configured to wirelessly receive electrical energy from the charger, in accordance with one or more aspects of this disclosure. As shown in FIGS. 3A-3C, a T-core, such as core 326C, may include main cylinder 327, having first end 329 and second end 331, and first supplemental cylinder 335 disposed at or adjacent to first end 329. First supplemental cylinder 335 may have a longitudinal axis that is co-axial with the longitudinal axis of main cylinder 327, and have a diameter $D_{1supp}$. As shown in FIGS. 3A-3C, the diameter of first supplemental cylinder 335 may be larger than a diameter of the main cylinder (i.e., $D_{1supp} > D_{main}$). The wireless charging receive coil may be positioned around a longitudinal axis of the core and may be bounded by the first supplemental cylinder. For instance, as shown in FIG. 3C, wireless receive coil 312C may be positioned around main cylinder 327 and may be bounded by first supplemental cylinder 335. As shown in FIG. 3C, a diameter of wireless receive coil 312C may be greater than the diameter of main cylinder 327 but less than or equal to a diameter of first supplemental cylinder 335. In some examples, this may result in a primary axis of wireless receive coil being co-axial with the longitudinal axis of the core. As shown in FIG. 3C, a height of first supplemental cylinder 335 may be less than a height of main cylinder 327 (i.e., $H_{1supp} > H_{main}$).

While indicated as extending from end 331 to first supplemental cylinder 335, in some examples main cylinder 327 may be considered to extend through first supplemental cylinder. As such, in some examples, a height of main cylinder 327 may be the sum of $H_{main}$ and $H_{1supp}$.

Figure 4A:
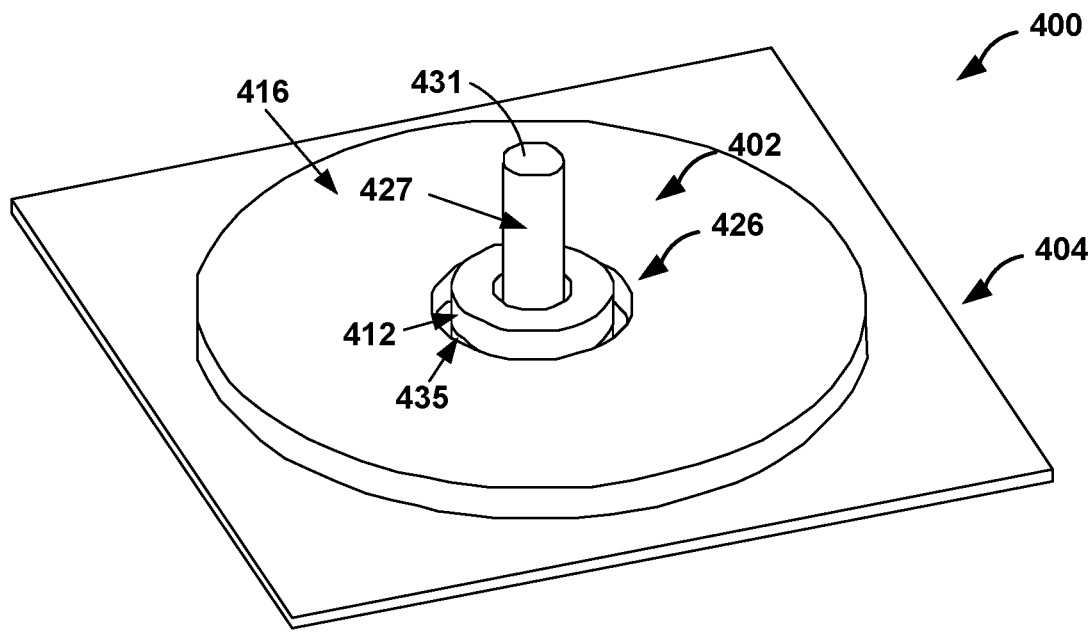
FIGS. 4A and 4B are conceptual diagrams illustrating an example system that includes a charger and an active stylus configured to wirelessly receive electrical energy from the charger, in accordance with one or more aspects of this disclosure.
Figure 4B:
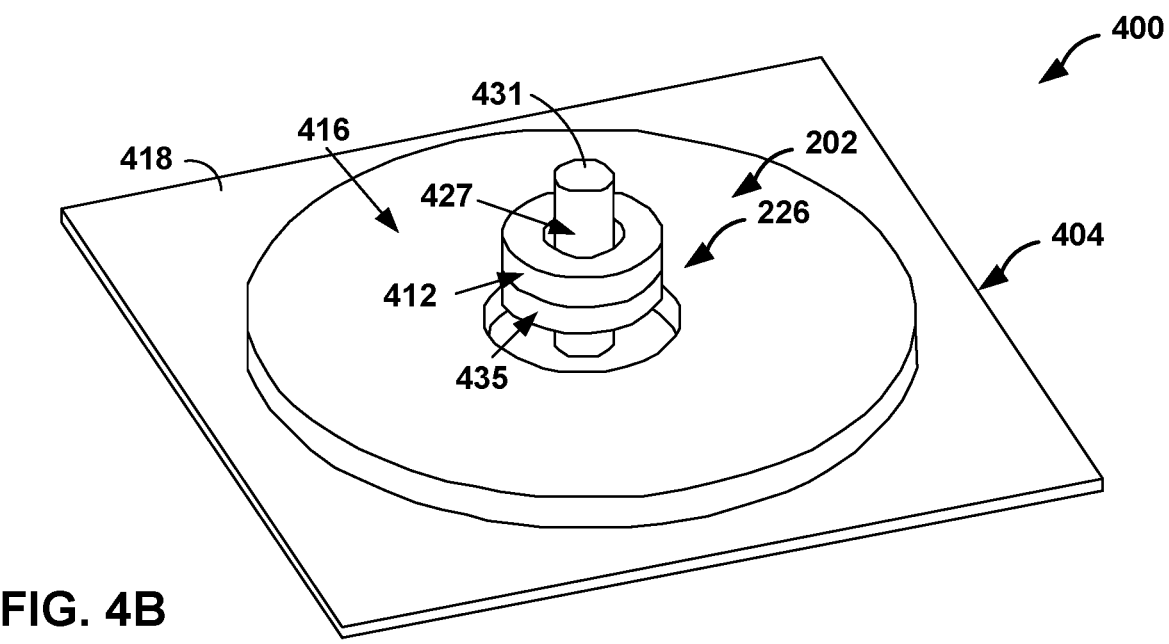

FIGS. 4A and 4B are conceptual diagrams illustrating an example system that includes a charger and an active stylus configured to wirelessly receive electrical energy from the charger, in accordance with one or more aspects of this disclosure. For purposes of illustration, housings and other components of the active stylus and charger are not shown in FIGS. 4A and 4B. Stylus 402 and charger 404 of FIGS. 4A and 4B may be considered an example of a stylus of styli 302 and a charger of chargers 304 of FIGS. 3A-3C. As shown in FIGS. 4A and 4B, stylus 402, and thus wireless charging receive coil 412 and core 426, may be positioned at various displacements along axis 433 with respect to charger 404, and thus wireless charging transmit coil 416. As discussed above, displacement between coils may influence a coupling factor between the coils. For instance, as the displacement in the example of FIG. 4A is less than the displacement in the example of FIG. 4B, the coupling factor may be greater in the example of FIG. 4A than in the example of FIG. 4B. With the use of a T-core, the coupling factor may be 0.76 in the example of FIG. 4A and 0.28 in the example of FIG. 4B.

FIGS. 5A-5C are conceptual diagrams illustrating example systems that include a charger and an active stylus configured to wirelessly receive electrical energy from the charger, in accordance with one or more aspects of this disclosure. As shown in FIGS. 5A-5C, a ±-core, such as core 526C, may include a main cylinder 527, having a first end 529 and a second end 531, a first supplemental cylinder 535 disposed at or adjacent to first end 529, and a second supplemental cylinder 537 disposed between the supplemental cylinder 535 and second end 531 of main cylinder 527. Similar to first supplemental cylinder 535, second supplemental cylinder 537 may have a longitudinal axis that is co-axial with the longitudinal axis of main cylinder 527, and have a diameter $D_{2supp}$. As shown in FIGS. 5A-5C, the diameter of the first supplemental cylinder may be larger than a diameter of the main cylinder (i.e., $D_{2supp} > D_{main}$). In some examples, the diameter of the first supplemental cylinder may be equal to the diameter of the second supplemental cylinder (i.e., $D_{1supp} = D_{2supp}$). In some examples, the diameter of the first supplemental cylinder may be different than (e.g., greater than or less than) the diameter of the second supplemental cylinder. The wireless charging receive coil may be positioned around a longitudinal axis of the core and may be bounded by the first supplemental cylinder and the second supplemental cylinder. For instance, as shown in FIG. 5C, wireless receive coil 512C may be positioned around main cylinder 527 and may be bounded by first supplemental cylinder 535 and second supplemental cylinder 537. As shown in FIG. 5C, a diameter of wireless receive coil 512C may be greater than the diameter of main cylinder 527 but less than or equal to a diameter of first supplemental cylinder 535. In some examples, this may result in a primary axis of wireless receive coil being co-axial with the longitudinal axis of the core. As shown in FIG. 5C, a height of first supplemental cylinder 535 may be less than a height of main cylinder 527 (i.e., $H_{1supp} > H_{main}$). In some examples, the height of the first supplemental cylinder may be equal to the height of the second supplemental cylinder (i.e., $H_{1supp} = H_{2supp}$). In some examples, the height of the first supplemental cylinder may be different than (e.g., greater than or less than) the height of the second supplemental cylinder.

While indicated as extending from end 531 to first supplemental cylinder 535, in some examples main cylinder 527 may be considered to extend through first supplemental cylinder 535 and second supplemental cylinder 537. As such, in some examples, a height of main cylinder 527 may be the sum of $H_{main}$ and $H_{1supp}$.

Figure 6A:
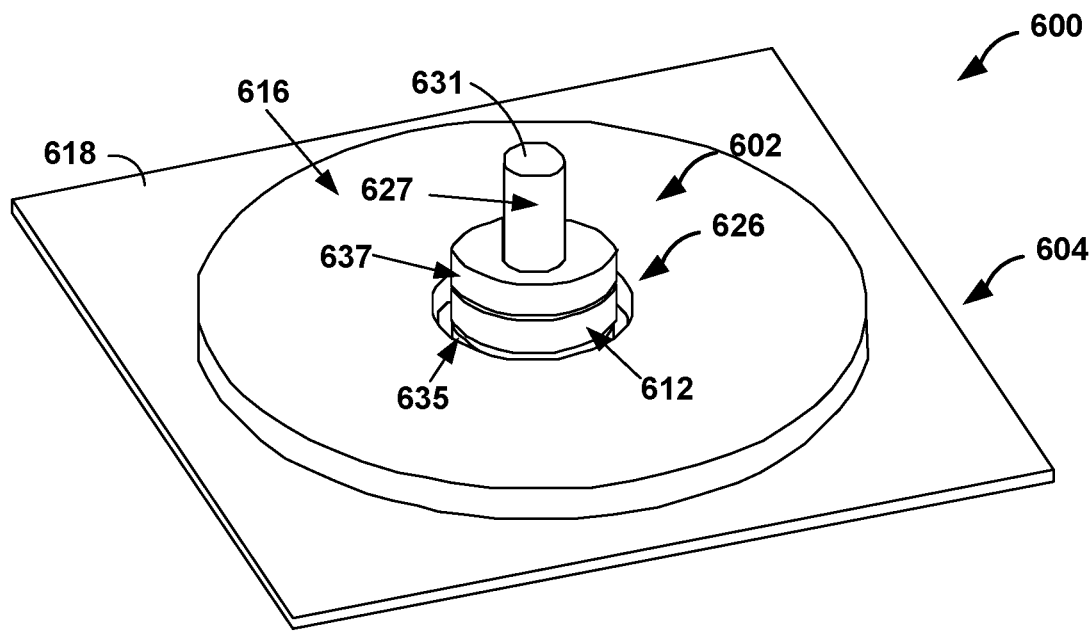
FIGS. 6A and 6B are conceptual diagrams illustrating an example system that includes a charger and an active stylus configured to wirelessly receive electrical energy from the charger, in accordance with one or more aspects of this disclosure.
Figure 6B:
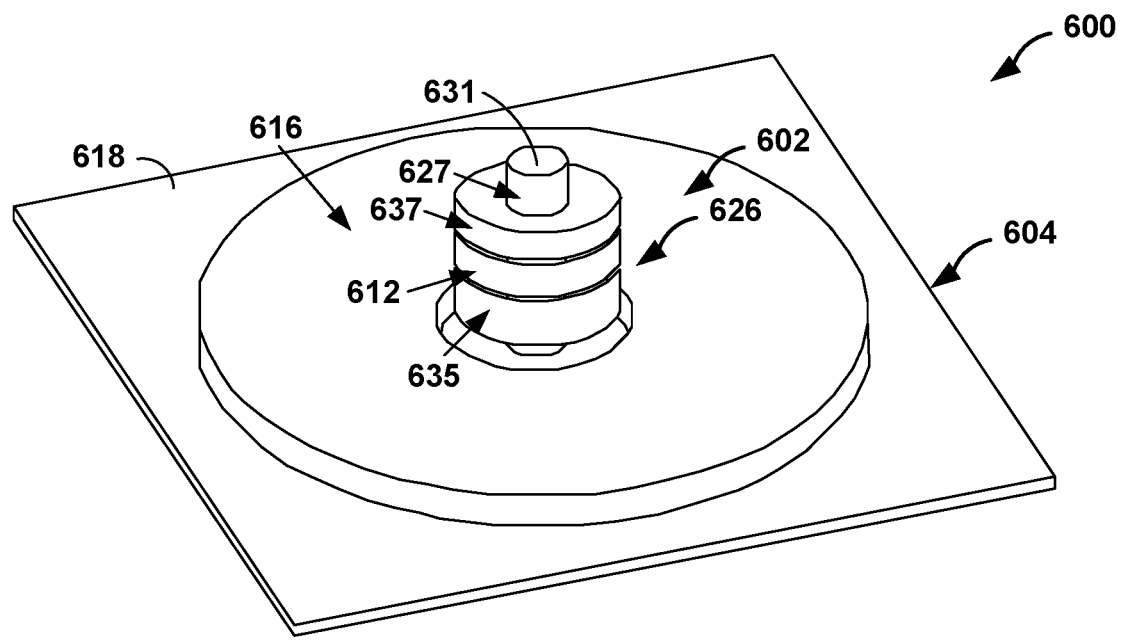

FIGS. 6A and 6B are conceptual diagrams illustrating an example system that includes a charger and an active stylus configured to wirelessly receive electrical energy from the charger, in accordance with one or more aspects of this disclosure. For purposes of illustration, housings and other components of the active stylus and charger are not shown in FIGS. 6A and 6B. Stylus 602 and charger 604 of FIGS. 6A and 6B may be considered an example of a stylus of styli 502 and a charger of chargers 504 of FIGS. 5A-5C. As shown in FIGS. 6A and 6B, stylus 602, and thus wireless charging receive coil 612 and core 626, may be positioned at various displacements along axis 633 with respect to charger 604, and thus wireless charging transmit coil 616. As discussed above, displacement between coils may influence a coupling factor between the coils. For instance, as the displacement in the example of FIG. 6A is less than the displacement in the example of FIG. 6B, the coupling factor may be greater in the example of FIG. 6A than in the example of FIG. 6B. With the use of a 1-core, the coupling factor may be 0.77 in the example of FIG. 6A and 0.39 in the example of FIG. 6B.

FIGS. 7A-7C are conceptual diagrams illustrating example systems that include a charger and an active stylus configured to wirelessly receive electrical energy from the charger, in accordance with one or more aspects of this disclosure. As shown in FIGS. 7A-7C, a I-core, such as core 726C, may include a main cylinder 727, having a first end 729 and a second end 731, a first supplemental cylinder 735 disposed at or adjacent to first end 729, and a second supplemental cylinder 737 disposed at or adjacent to second end 731. Similar to first supplemental cylinder 735, second supplemental cylinder 737 may have a longitudinal axis that is co-axial with the longitudinal axis of main cylinder 727, and have a diameter $D_{2supp}$. As shown in FIGS. 7A-7C, the diameter of the first supplemental cylinder may be larger than a diameter of the main cylinder (i.e., $D_{2supp} > D_{main}$). In some examples, the diameter of the first supplemental cylinder may be equal to the diameter of the second supplemental cylinder (i.e., $D_{1supp} = D_{2supp}$). In some examples, the diameter of the first supplemental cylinder may be different than (e.g., greater than or less than) the diameter of the second supplemental cylinder. The wireless charging receive coil may be positioned around a longitudinal axis of the core and may be bounded by the first supplemental cylinder and the second supplemental cylinder. For instance, as shown in FIG. 7C, wireless receive coil 712C may be positioned around main cylinder 727 and may be bounded by first supplemental cylinder 735 and second supplemental cylinder 737. As shown in FIG. 7C, a diameter of wireless receive coil 712C may be greater than the diameter of main cylinder 727 but less than or equal to a diameter of first supplemental cylinder 735. In some examples, this may result in a primary axis of wireless receive coil being co-axial with the longitudinal axis of the core. As shown in FIG. 7C, a height of first supplemental cylinder 735 may be less than a height of main cylinder 727 (i.e., $H_{1supp} > H_{main}$). In some examples, the height of the first supplemental cylinder may be equal to the height of the second supplemental cylinder (i.e., $H_{1supp} = H_{2supp}$). In some examples, the height of the first supplemental cylinder may be different than (e.g., greater than or less than) the height of the second supplemental cylinder.

While indicated as extending from first supplemental cylinder 735 to second supplemental cylinder 737, in some examples main cylinder 727 may be considered to extend through first supplemental cylinder 735 to second supplemental cylinder 737. As such, in some examples, a height of main cylinder 727 may be the sum of $H_{main}$ and one or both of $H_{1supp}$ and $H_{2supp}$.

Figure 8A:
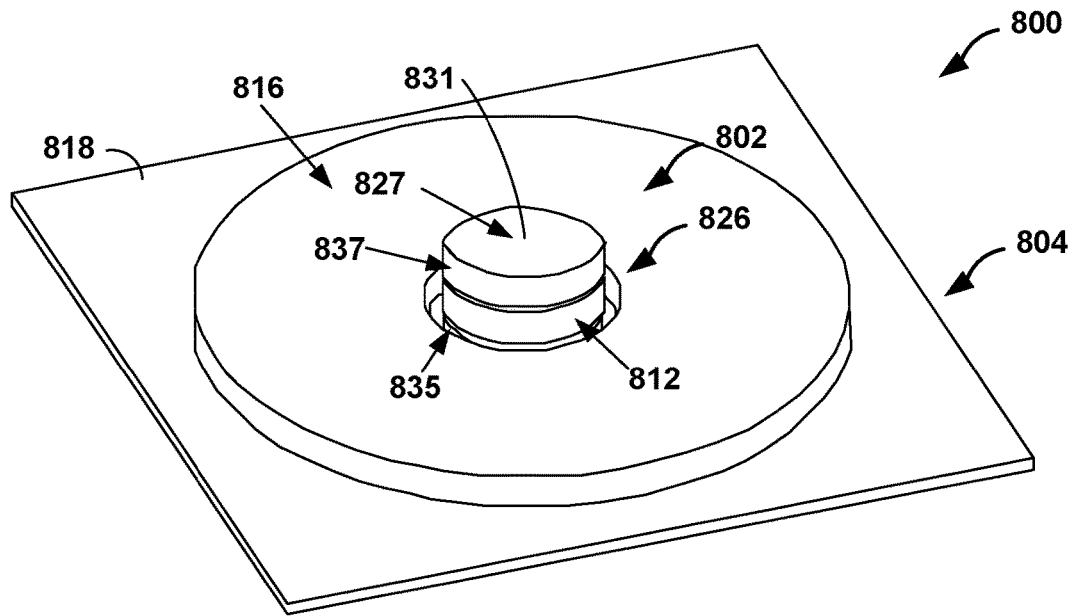
FIGS. 8A and 8B are conceptual diagrams illustrating an example system that includes a charger and an active stylus configured to wirelessly receive electrical energy from the charger, in accordance with one or more aspects of this disclosure.
Figure 8B:
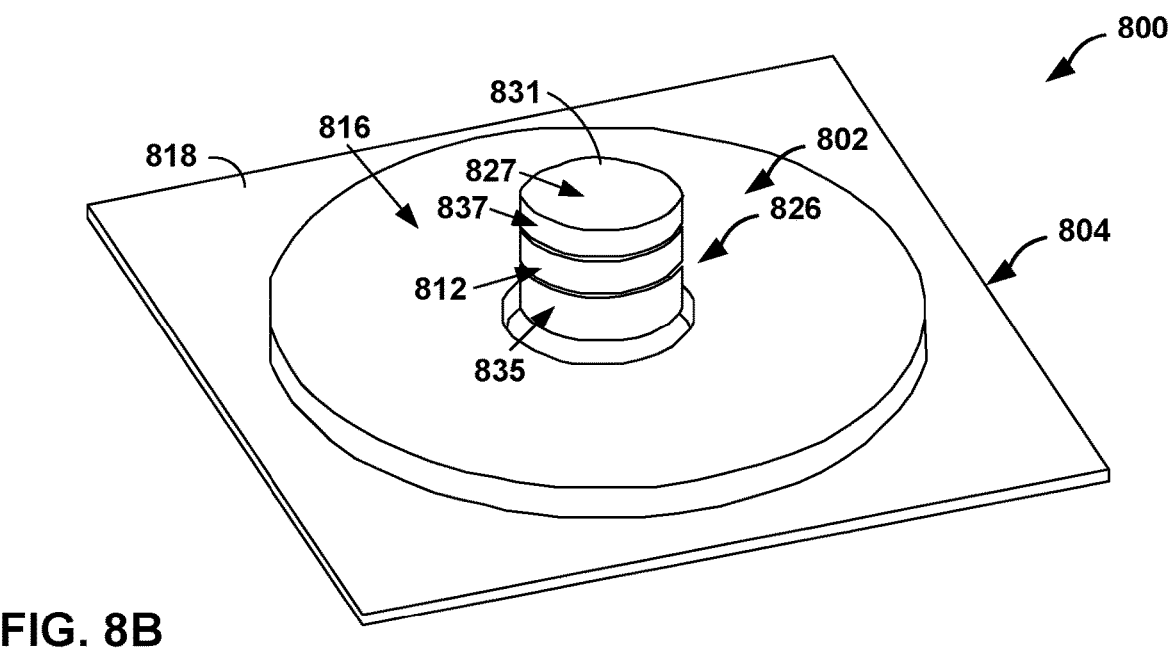

FIGS. 8A and 8B are conceptual diagrams illustrating an example system that includes a charger and an active stylus configured to wirelessly receive electrical energy from the charger, in accordance with one or more aspects of this disclosure. For purposes of illustration, housings and other components of the active stylus and charger are not shown in FIGS. 8A and 8B. Stylus 802 and charger 804 of FIGS. 8A and 8B may be considered an example of a stylus of styli 702 and a charger of chargers 704 of FIGS. 7A-7C. As shown in FIGS. 8A and 8B, stylus 802, and thus wireless charging receive coil 812 and core 826, may be positioned at various displacements along axis 833 with respect to charger 804, and thus wireless charging transmit coil 816. As discussed above, displacement between coils may influence a coupling factor between the coils. For instance, as the displacement in the example of FIG. 8A is less than the displacement in the example of FIG. 8B, the coupling factor may be greater in the example of FIG. 8A than in the example of FIG. 8B. With the use of a ±-core, the coupling factor may be 0.73 in the example of FIG. 8A and 0.35 in the example of FIG. 8B.

While described as being different components, the features of the cores may be a single component with the overall shape of merged sub-components. For instance, core 526C may be a single object with a shape of merged main cylinder 527, first supplemental cylinder 535, and second supplemental cylinder 537. Alternatively, the features of the cores may be separate components. For instance, first supplemental cylinder 535 and second supplemental cylinder 537 may be attached to main cylinder 527 to form core 526C.

As noted above, each of the different core shapes may have advantages. As one example, the I-core may be relatively inexpensive to implement. As another example, the T-core may provide a greatest cost to performance ratio. As another example, the ±-core may provide the best performance (e.g., greatest coupling factor). As another example, the I-core may be relatively inexpensive to implement. The inclusion of the first supplemental cylinder (e.g., a core disk on bottom), such as in the T-core, the ±-core, and the I-core may improve performance (e.g., increase the amount of flux guided through the wireless receive coil). By improving performance (i.e., increasing the coupling factor), the efficiency of wireless charging may be improved, which may decrease recharge times of active styli.

Various aspects of the disclosure have been described. These and other embodiments are within the scope of the following claims.

What is claimed is:

1. An active stylus comprising:
a power storage device;
one or more components configured to operate using electrical energy provided by the power storage device;
a core comprising:
a main cylinder having a first end, a second end;
a first supplemental cylinder disposed at the first end of the main cylinder and having a diameter that is larger than a diameter of the main cylinder;
a second supplemental cylinder disposed between the first supplemental cylinder and the second end of the main cylinder and having a diameter that is larger than the diameter of the main cylinder; and
a wireless charging receive coil configured to provide received power to the power storage device, wherein the wireless charging receive coil is positioned around a longitudinal axis of the main cylinder of the core and between the first supplemental cylinder and the second supplemental cylinder.

2. The active stylus of claim 1, wherein a height of the first supplemental cylinder is equal to a height of the second supplemental cylinder.

3. The active stylus of claim 1, wherein a height of the first supplemental cylinder is different than a height of the second supplemental cylinder.

4. The active stylus of claim 3, wherein the height of the first supplemental cylinder is greater than the height of the second supplemental cylinder.

5. The active stylus of claim 1, wherein the longitudinal axis of the main cylinder of the core is parallel to a longitudinal axis of the active stylus.

6. The active stylus of claim 1, wherein the longitudinal axis of the main cylinder of the core is perpendicular to a longitudinal axis of the active stylus.

7. The active stylus of claim 2, further comprising an alignment aid configured to align the active stylus such that, during charging, the first end of the cylinder is closer to a wireless charging transmit coil than the second end of the cylinder.

8. A system comprising:
a charger comprising a wireless charging transmit coil; and
an active stylus comprising:
a core comprising:
a main cylinder having a first end, a second end;
a first supplemental cylinder disposed at the first end of the main cylinder and having a diameter that is larger than a diameter of the main cylinder;
a second supplemental cylinder disposed between the first supplemental cylinder and the second end of the main cylinder and having a diameter that is larger than the diameter of the main cylinder; and
a wireless charging receive coil configured to transduce flux of a magnetic field generated by the wireless charging transmit coil into electrical current, wherein the wireless charging receive coil is positioned around a longitudinal axis of the main cylinder of the core and between the first supplemental cylinder and the second supplemental cylinder.

9. The active stylus of claim 8, wherein a height of the first supplemental cylinder is equal to a height of the second supplemental cylinder.

10. The active stylus of claim 8, wherein a height of the first supplemental cylinder is different than a height of the second supplemental cylinder.

11. The active stylus of claim 10, wherein the height of the first supplemental cylinder is greater than the height of the second supplemental cylinder.

12. The active stylus of claim 8, wherein the longitudinal axis of the main cylinder of the core is parallel to a longitudinal axis of the active stylus.

13. The active stylus of claim 8, wherein the longitudinal axis of the main cylinder of the core is perpendicular to a longitudinal axis of the active stylus.

14. The active stylus of claim 9, further comprising an alignment aid configured to align the active stylus such that, during charging, the first end of the cylinder is closer to a wireless charging transmit coil than the second end of the cylinder.

* * * * *